United States Patent [19]
Kerrigan

[11] Patent Number: 5,360,305
[45] Date of Patent: Nov. 1, 1994

[54] CLINCH STAPLES AND METHOD OF MANUFACTURING AND APPLYING CLINCH STAPLES

[75] Inventor: James E. Kerrigan, Des Plaines, Ill.

[73] Assignee: Duo-Fast Corporation, Franklin Park, Ill.

[21] Appl. No.: 34,505

[22] Filed: Mar. 19, 1993

[51] Int. Cl.⁵ .................. F16B 15/00; B21G 7/02; B21B 39/00
[52] U.S. Cl. .................. 411/472; 411/920; 59/77; 29/505
[58] Field of Search .......... 411/457, 471, 472, 920; 470/40; 59/73-77; 29/505

[56] References Cited

U.S. PATENT DOCUMENTS

| | | |
|---|---|---|
| 1,998,991 | 4/1935 | Heller ........................ 59/77 |
| 2,125,211 | 7/1938 | Vogel ........................ 59/77 |
| 3,869,957 | 3/1975 | Barth et al. . |
| 3,925,955 | 12/1975 | Becht . |
| 4,265,160 | 5/1981 | Martinez . |
| 5,035,040 | 7/1991 | Kerrigan et al. . |

*Primary Examiner*—Neill R. Wilson
*Attorney, Agent, or Firm*—Mason, Kolehmainen, Rathburn & Wyss

[57] ABSTRACT

A clinch type staple has a U-shaped configuration with a pair of legs extending generally perpendicularly from a base portion of the staple with the outside surfaces of the distal ends of the legs being bevelled. The legs of the staple lie in spaced apart planes that are parallel to one another, but are angularly offset from one another in order to insure that the legs will not contact or interfere with each other as they are clinched into a workpiece. A plurality of such clinch staples can be manufactured into an assembly of clinch staples. The method of making such an assembly of clinch staples includes advancing a plurality of wires in parallel side-by-side relation in a flat planar array and adhering the wires to one another. A blank, severed from an end of the formed array, includes a plurality of side-by-side wire segments of equal length extending parallel to one another in a first direction. The severing of the wires is accomplished along a cutting line that is inclined by a bias angle from a perpendicular to the first direction. The blank is bent along two bending lines to form a U-shaped stick of clinch staples with the legs extending perpendicularly from a base or bight portion of the staples. The two bending lines are parallel to the cutting line so that the legs of the formed staples will be offset angularly from each other.

5 Claims, 2 Drawing Sheets

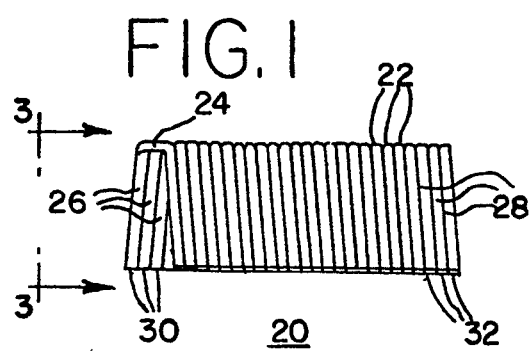
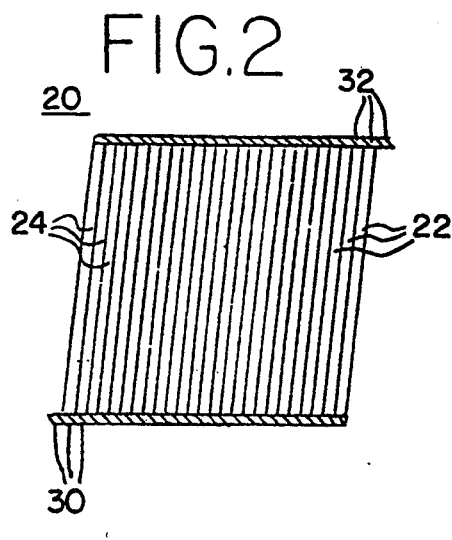
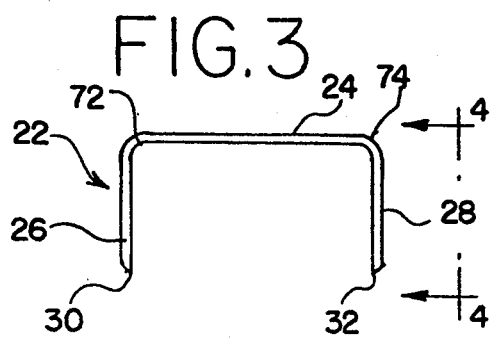
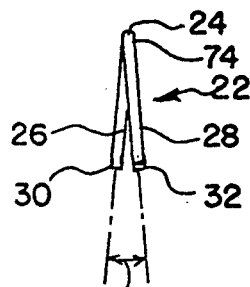
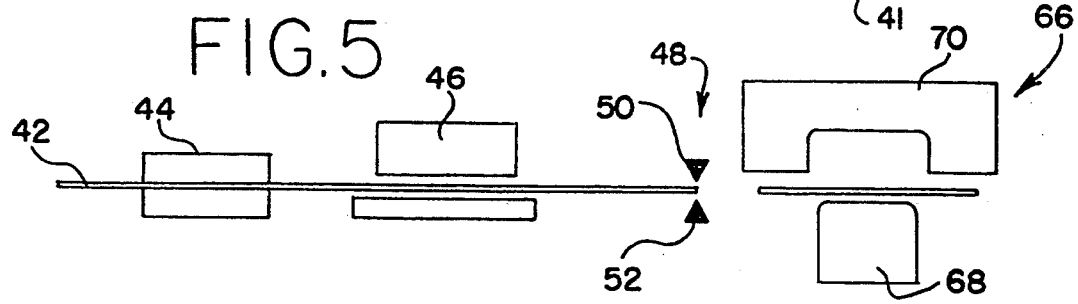
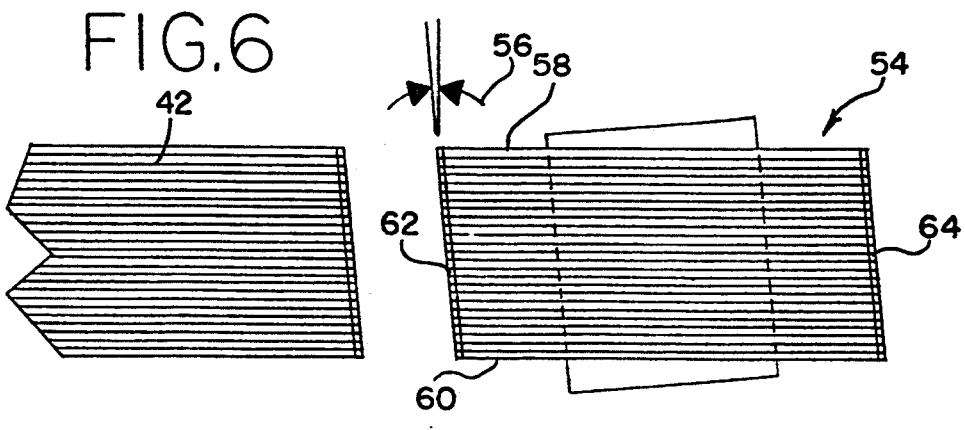

CLINCH STAPLES AND METHOD OF MANUFACTURING AND APPLYING CLINCH STAPLES

BACKGROUND OF THE INVENTION

1. Field of the Invention

The present invention relates generally to fasteners, and, more particularly, to a new and improved clinch staple and to a new and improved method of making assemblies of such clinch staples that enables the staples to be more readily manufactured and clinched into workpieces.

2. Description of the Prior Art

Clinch staples may be used to fasten two workpieces together. For example, a lattice may be formed of two thin strips of wood that are fastened together where they intersect. While the strips of wood tend to be thin, conventional straight leg staples may not be suitable for fastening the wood strips together because the legs tend to be too short. Consequently, clinch type staples having longer legs are used. The longer legs can be driven through both pieces of wood with the ends of the legs turned back or clinched into the wood when they strike a flat metal anvil situated below the pieces of wood.

In order for the legs to be deflected inwardly or toward each other as they are driven into the workpieces, the outside surfaces of the distal ends of the legs of the clinch staples are beveled. However, some provision must be made to assure that the legs are separated from one another as they are so deflected or they will contact or interfere with each other as they are being driven back into the workpieces after contacting the anvil. While oppositely directed, saw-toothed configured ends on legs of clinch staples tend to insure that the legs will not interfere with each other as they are being clinched into workpieces, such staples cannot be readily and economically manufactured.

A staple is a formed wire fastener having a generally U-shape configuration with parallel legs projecting perpendicularly from each end of a base or bight portion of the staple. Such staples can be economically fabricated and formed into assemblies of staples by means of automated manufacturing and packaging equipment. For example, reference is made to Kerrigan et al. U.S. Pat. No. 5,035,040 that in part discloses a method of manufacturing of another type of fastener, i.e., hog ring fasteners. The staples that are the most economical to manufacture are those that are formed with points at the end of each leg that are formed by bevelling the end of the legs along planes perpendicular to the plane in which the base and legs of the staple lie. These points at the end of the staple legs are typically referred to as "C" points (a modified version of a "C" point—sometimes referred to as a "CO" point—results when only the outside surface of the end of the staple leg is bevelled). However, problems occur when conventional clinch type of staples having this type of modified "C" point or "CO" point are clinched into a workpiece because the legs of the staples will tend to contact or interfere with each other as the staples are being clinched into the workpieces. Staples can be provided with offset points bevelled in the transverse direction (typically referred to as a "D" point) so that the ends of the legs have a saw-toothed configuration. When the saw-toothed ends are formed in the opposite directions on each leg of the staple, the legs will be deflected from each other as they are being clinched into the workpieces and therefore will not interfere with each other. Unfortunately, the forming of such points requires a more expensive manufacturing process.

Many staple type of fasteners are made in a multi-wire process in which numerous wires are fed side-by-side in a flat plane to bonding, cutoff and forming stations. This is an economical and efficient process for producing staples with a "C" point where the ends of the staple legs are bevelled generally perpendicular to the plane of the fastener. This type of point is formed by pinching off a blank from the flat array of adhered wires prior to forming the wires into the final U-shape configuration of the staple. The blank is rectangular and the legs are formed by bending the blank to make right angle corners perpendicular to the sides of the blank. However, saw-tooth, offset points at the ends of the legs of clinch staples cannot be readily formed using this manufacturing process and consequently, this more economical manufacturing process has not been used for the manufacture of clinch type of staples having "D" points.

SUMMARY OF THE INVENTION

Accordingly, an object of the present invention is to provide a new and improved clinch type staple in which the legs of the staple lie in parallel planes in order to attain the benefits of existing staple making and handling equipment and in which the legs of the staple are offset from each other in order that the legs do not interfere with each other as the fastener is driven into workpieces.

Another object of the present invention is to provide a new and improved clinch type staple that can be efficiently and economically formed into assemblies of staples by utilizing multi-wire manufacturing and packaging equipment.

Yet another object of the present invention is to provide a new and improved clinch type staple that includes modified "C" or "CO" points on ends of the legs of the staple, but nevertheless the legs of the staple are adapted to move past each other as the fastener is driven and clinched into workpieces.

Still another object of the present invention is to provide a new and improved method of installing a clinch type staple having parallel legs that are offset from each other to be installed into workpieces such that the legs of the staple do not interfere or contact each other as the clinch type staple is driven into the workpieces.

In accordance with these and many other objects of the present invention, a fastener embodying the present invention is a clinch type staple having a U-shaped configuration with a pair of legs extending generally perpendicularly from a base or bight portion of the staple with the outside surfaces of the distal ends of the legs being bevelled. The legs of the staple lie in spaced apart planes that are parallel to one another, but are angularly offset from one another in order to insure that the legs will not contact or interfere with each other as they are clinched into a workpiece.

In accordance with another aspect of the present invention, a plurality of such clinch staples are manufactured into an assembly of clinch staples by adhering the clinch staples into a stick or strip of similar staples. Each of the staples is generally U-shaped having a base or bight portion and a pair of legs extending from the base. The bases of the staples lie in a first plane and the legs extending from the bases lie in second and third planes. These second and third planes are spaced apart from each other, but are parallel to one another and are perpendicular to the first plane. In addition, the legs in the second plane are angularly offset from the legs in the third plane.

The present invention also includes a method of making assemblies of clinch staples by advancing numerous wires in parallel side-by-side relation in a flat planar array and adhering the wires to one another. A blank is severed from an end of the formed array. The blank includes a number of side-by-side wire segments of equal length extending parallel to one another in a first direction. The blank then is bent along two bending lines to form a U-shaped stick of clinch staples with the legs extending perpendicularly from a base or bight portion of the staples. The severing step includes cutting the wires along a cutting line that is inclined by a bias angle from a perpendicular to the first direction. In order that the legs of the formed staples are offset angularly from each other, the bending lines also are parallel to the cutting line.

BRIEF DESCRIPTION OF THE DRAWING

These and other objects and advantages of the present invention will become readily apparent upon consideration of the following detailed description of the embodiment of the invention shown in the accompanying drawings wherein:

FIG. 1 is a side elevational view of an assembly of fasteners embodying the present invention;

FIG. 2 is a bottom view of the assembly of fasteners of FIG. 1;

FIG. 3 is a front elevational view of a single fastener from the assembly of fasteners of FIG. 1 taken generally from the line 3—3 of FIG. 1 but taken from a plane parallel to the base of the fastener;

FIG. 4 is a side elevational view of the fastener of FIG. 3 taken from line 4—4 of FIG. 3;

FIG. 5 is a schematic and diagrammatic view illustrating the steps in a method of manufacturing the assembly of fasteners of FIGS. 1 and 2 in accordance with another aspect of the present invention;

FIG. 6 is a fragmentary, top plan view illustrating a part of the method of manufacturing the assembly of fasteners of FIGS. 1 and 2;

DETAILED DESCRIPTION OF THE PREFERRED EMBODIMENT

Figure 7:
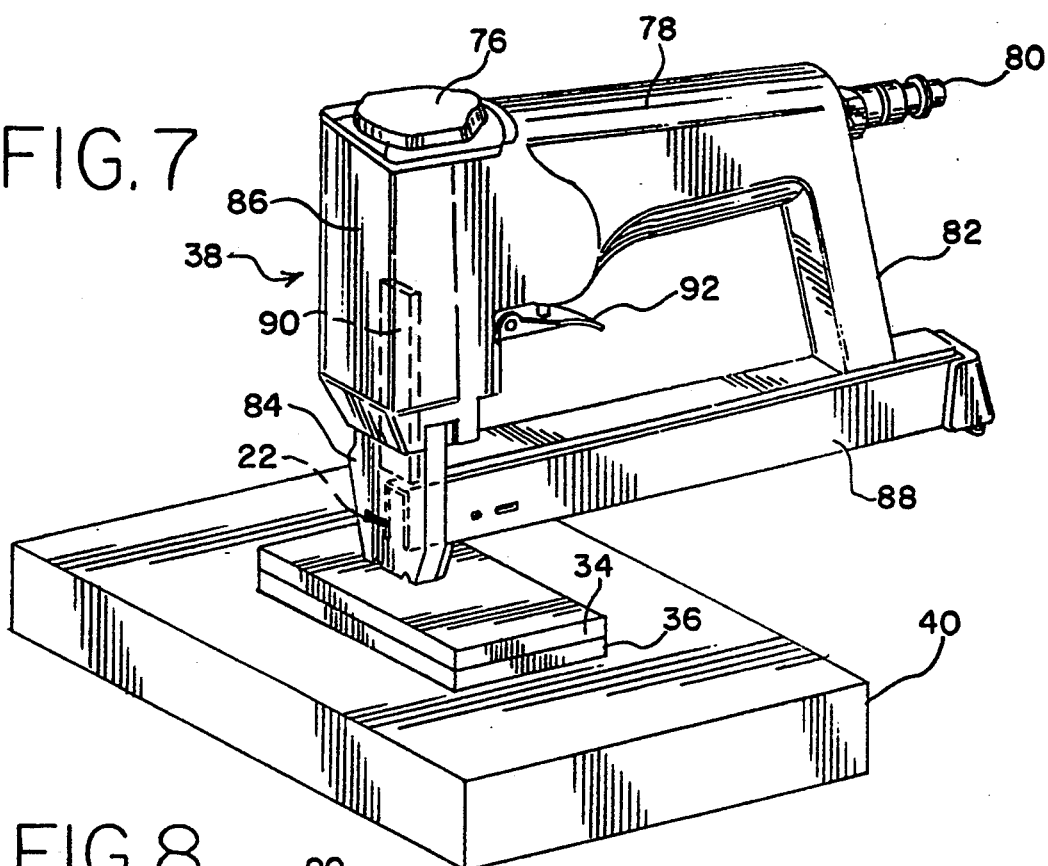
FIG. 7 is a perspective view of a fastener driving tool that is positioned relative to workpieces disposed on an anvil in order to drive a fastener from the assembly of fasteners of FIGS. 1 and 2 into the workpieces.

Referring now more specifically to FIGS. 1 and 2 of the drawings, therein is disclosed an assembly of fasteners generally designated by the reference numeral 20 and embodying the present invention. The assembly of fasteners 20 includes a plurality of similar fasteners 22 constructed in accordance with the present invention. As is more readily seen in FIGS. 3 and 4 of the drawings, each fastener 22 is a length of wire formed generally in a U-shaped configuration with a base or bight portion 24 and a pair of legs 26 and 28 having respective bevelled ends 30 and 32. The assembly of fasteners 22 may be manufactured by the process discussed hereinafter in connection with FIGS. 5 and 6 of the drawings.

Figure 8:
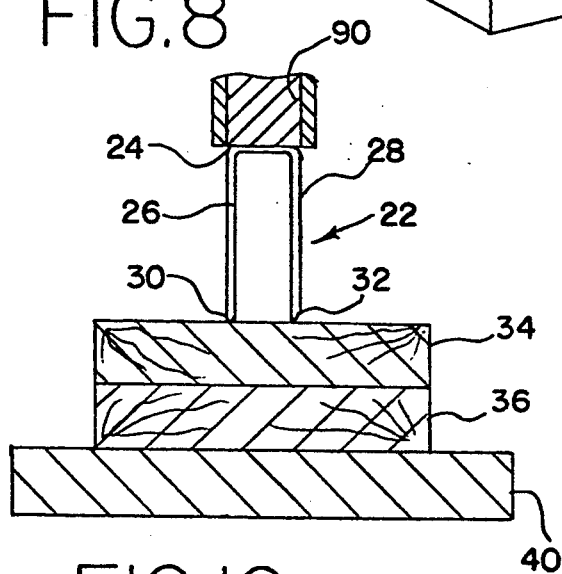
FIG. 8 is a partial, cross sectional view illustrating a clinch staple as it is being driven into the workpieces by the driver in the fastener driving tool illustrated in FIG. 7.
Figure 9:
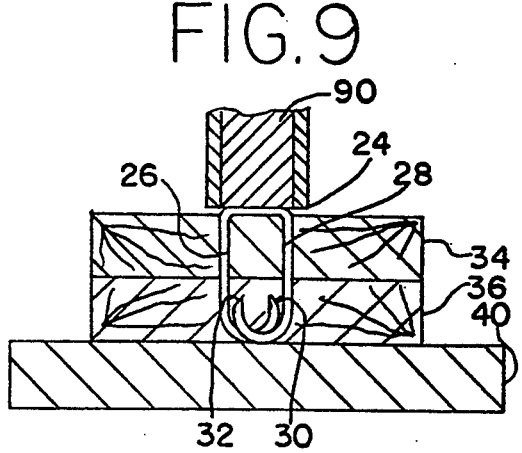
FIG. 9 is a partial, cross sectional view showing a clinch staple after it has been driven into the workpieces by the fastener driving tool illustrated in FIG. 7.
Figure 10:
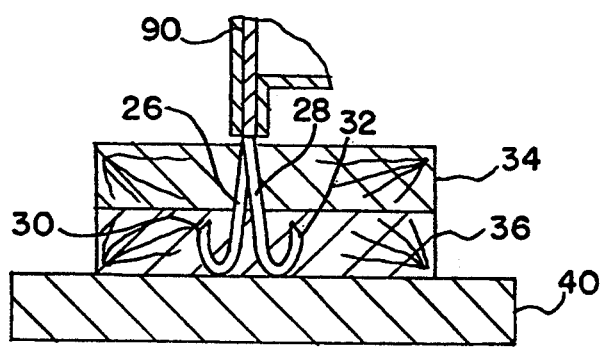
FIG. 10 is another partial cross sectional view showing the clinch staple of FIG. 9 after it has been driven into the workpieces by the fastener driving tool illustrated in FIG. 7.

The fastener 22 is a clinch type of staple that is adapted to be driven into workpieces, such as a pair of workpieces 34 and 36 illustrated in FIGS. 7-9, by a fastener driving tool 38 (FIG. 7). When the fastener 22 is driven into the workpieces 34 and 36, the ends 30 and 32 of the legs 26 and 28 impact against an anvil 40 because the legs 26 and 28 are longer than the combined thickness of the workpieces 34 and 36. As a result of this impact and the bevelled ends 30 and 32, the legs 26 and 28 are deflected toward each other and turned back into the workpiece 36 thereby clinching or are otherwise securing the legs 26 and 28 in the workpiece 36 such that the workpieces 34 and 36 are secured together by the fastener 22.

As will be discussed in more detail in connection with the method of manufacturing the assembly of fasteners 20 illustrated in FIGS. 5 and 6, each of the fasteners 22 is formed from a length of wire into a generally U-shaped configuration with the legs 26 and 28 projecting perpendicularly from opposite ends of the base or bight portion 24. As is apparent from FIGS. 1-4, the legs 26 and 28 of the fasteners 22 lie in parallel planes (as viewed in FIG. 3), but the legs 26 and 28 are not parallel to each other. Instead the legs 26 and 28 project from the base 24 at a slightly different or offset angle 41 (FIG. 4). The offset angle 41 between the legs 26 and 28 is sufficiently large to assure that the legs 26 and 28 do not contact each other as they are driven into and through the workpieces 34 and 36 even though the legs 26 and 28 are being deflected inwardly or toward each other. The optimum size of the offset angle 41 between the legs 26 and 28 depends on the dimensions of the fastener 22 and the wire from which it is made. A preferred range for the offset angle 41 may be from about one degree to about five degrees with a preferred offset angle 41 being about two degrees.

It is common for clinch type staples with parallel or symmetrical legs to use oppositely directed "D" points to prevent interference between the fastener legs as the fastener is being driven into a workpiece. With this type of arrangement, points are cut on each of the legs so that a saw-tooth configuration is formed along each end of the legs of the fasteners of an assembly of fasteners. The saw-tooth ends on one side of the fasteners are directed in one direction along the length of the assembly while the other saw-tooth ends are directed in the opposite direction. However, such "D" points cannot be formed by simple cutoff tooling in a multi-wire process of the type described hereinafter in connection with FIGS. 5 and 6. To the contrary, the "D" points must be made as a practical manner by a more expensive process in which one wire at a time is severed and formed by cutoff tooling.

The distal ends 30 and 32 at the extremity of the legs 26 and 28 are pointed and beveled to aid in the installation of the fastener 20 through and into the workpieces 34 and 36. The bevelling of the ends 30 and 32 is only on the outside surfaces of the legs 26 and 28. These configured ends 30 and 32 of the fasteners 22 are of a type known as modified "C" or "CO" points. The points are defined by two intersecting inclined planes running along the length of the ends 30 and 32 of the fasteners 22 when they are formed into the assembly of fasteners 20. By using a modified "C" point at the ends 30 and 32, the fasteners 22 can be more readily and economically formed using the multi-wire fabrication process illustrated in FIGS. 5 and 6.

Manufacturing of the assembly of fasteners 20 as illustrated in FIGS. 5 and 6 provides a method that is both easily and economically accomplished. Preferably any conventional multi-wire staple manufacturing process can be modified in order to accomplish the manufacturing of the assembly of clinch type staples 20 disclosed herein.

The process is begun by supplying a number of individual discrete wires 42 from a source or supply (not shown) in a flat planar, side-by-side array. The array of wires 42 is moved through an application station 44 where an adhesive or binder is applied to the array of wires 42. The adhesive usually is in a liquid form so that it can be readily applied to the array of wires 42. After the adhesive or binder is applied, the adhesive or binder needs to be dried or cured. As a result, the array of wires 42 are fed through a drying or curing station 46 where heat, air or the like is applied to the array of wires 42. At this point in the fabrication of the assembly of fasteners 20, each wire 42 is adhered to the adjacent wire or wires 42 such that a flat planar web or strip of wires 42 is formed (see FIG. 6).

The web or strip of wires 42 then is advanced to a cutoff station 48 that includes cutoff blades or tools 50 and 52. The tools 50 and 52 are adapted to sever a blank 54 from the end of the adhered wires 42. The tools 50 and 52 are arranged at a bias angle 56 (see FIG. 6) offset from a line perpendicular to the direction in which the wires 42 extend. The bias angle 56 determines the leg offset angle 41 between the legs 26 and 28 of each fastener 22. Side edges 58 and 60 of the blank 46 are defined by and coincide with the direction or length of the wires 42. Ends 62 and 64 of the blank 46 are parallel to one another, but are angularly offset by the bias angle 56 from a line that is perpendicular to the side edges 58 and 60. Unlike in a conventional multi-wire process where a rectangular blank is severed at a cutoff station, the blank 54 of the present invention is formed into a non-rectangular parallelogram shape with opposed corners defined alternately by ninety degree plus the bias angle 56 and ninety degree minus the bias angle 56.

After the blank 54 is formed, the blank 54 is conveyed to a forming station 66 (FIG. 5). The forming station 66 includes cooperating forming tools 68 and 70. When the tools 68 and 70 are closed onto the blank 46, the blank 46 is shaped into the assembly of fasteners 20. In this forming operation, corners 72 of the assembly 20 result where the legs 26 are deformed to extend from the bases 24 and corners 74 result where the legs 28 are deformed to extend from the opposite end of the bases 24. Once the forming operation has been completed, all of the legs 26 and 28 are of equal length and are in parallel planes. All of the legs 26 on one side of the assembly 20 lie in a first flat plane, all of the legs 28 on the other side of the assembly 20 line in a second flat plane and all of the bases 24 lie in a third flat plane. The first and second planes are parallel to each other and are perpendicular to the third plane. The corners 72 and 74 are somewhat rounded or gradual and constitute right angle corners respectively between the first and third planes and between the second and third planes.

In a conventional multi-wire fabrication process, the forming tooling is arranged so that its edges lie along lines perpendicular to the direction that the individual wires extend. In contrast, the tooling of the present invention, as is illustrated in FIG. 6, is arranged so that its edges extend along lines that are angularly offset by the bias angle 56 from a line perpendicular to the direction that the individual wires 42 extend and are parallel to the front edge 62 and the rear edge 64 of the blank 54.

Unlike conventional fastener assemblies made by known multi-wire fabrication techniques, the assembly 20 that is formed by the method illustrated in FIGS. 5 and 6 does not occupy a rectangular, right cylindrical volume. Instead, the legs 26 and 28 are canted or biased with respect to each other by the bias angle 41. The angular offset 56 between the side edges 58 and 60 of the blank 54 and the forming tools 68 and 70 causes the legs 26 and 28 to extend at different angles from the bases 24 to provide each individual fastener 22 with the offset angle 41 seen in FIG. 4. The assembly 20 is generally channel shaped with a longitudinal axis extending along the length of the assembly 20. Each leg 26 and 28 and each base 24 is angularly inclined with respect to this longitudinal axis.

The fasteners 22 and the assembly 20 have significant advantages that are not achieved with known clinch type staples. One of these advantages is that they can be economically made with modified conventional multi-wire staple making equipment. Moreover, assemblies 20 can be handled and packaged at low cost by existing equipment used for other fasteners. Due in part to the fact that the planes of the legs 26 and 28 of the assemblies are parallel, the assemblies can be internested in dense and efficient packaging arrays.

Once the assembly 20 is formed, the assembly 20 can be loaded into the fastener driving tool 38. The fastener driving tool 38 can be adapted from any standard type of fastener driving tool. The particular fastener driving tool 38 disclosed in FIG. 7 is a pneumatically actuated fastener driving tool. The fastener driving tool 38 includes a housing 76 with a rearwardly extending handle portion 78. An inlet 80 that is adapted to be coupled to a supply of compressed air (not shown) is disposed at a rear end 82 of the handle portion 78. The housing 76 also includes a nosepiece assembly 84 that is disposed at a front end 86 of the housing 76. A magazine 88 extending from the rear end 82 of the handle portion 78 to the nosepiece assembly 84 is adapted to receive the assembly of fasteners 20 and to feed successive ones of the fasteners 22 into the nosepiece assembly 84 so that the successive fasteners 22 can be driven into the workpieces 34 and 36 by a driver blade 90.

More specifically, the fastener driving tool 38 is actuated by the depression of a trigger 92.. When the trigger 92 is so actuated, compressed air provided through the inlet 80 is supplied to a drive cylinder (not shown) within the housing 76 to thereby drive the driver blade 90 downwardly in the housing 76 so that one of the fasteners 22 in the nosepiece 84 is driven into the workpieces 34 and 36 (see generally FIGS. 7–10). As the legs 26 and 28 of the fastener 22 are driven through the workpiece 34, the legs 26 and 28 tend to deflect inwardly or toward each other due to the bevels on the outside surfaces of the ends 30 and 32 of the legs 26 and 28 respectively. The length of the legs 26 and 28 are sufficiently long that the ends 30 and 32 will be driven through both of the workpieces 34 and 36 and contact the anvil 40 on which the workpiece 36 is disposed. As the ends 30 and 32 penetrate through the second workpiece 36 and contact the anvil 40, the ends 30 and 32 are deflected upward into the workpiece 36 to thereby clinch the fastener 22 in the workpiece 36. However, the legs 26 and 28 do not contact or interfere with each other due to the fact that the legs are offset from each other by the offset angle 41 and therefore deflect past each other. As a result, the workpieces 34 and 36 are secured together by the staple 22.

Obviously, many modifications and variations of the present invention are possible in light of the above teachings. Thus, it is to be understood that, within the scope of the appended claims, the invention may be practiced otherwise than as specifically described above.

What is claimed and desired to be secured by Letters Patent of the United States is:

1. A clinch staple for securing together first and second workpieces disposed on a support means, said clinch staple comprising:
    a base and first and second staple legs extending perpendicularly from said base and lying in planes generally parallel to one another, said first staple leg being offset at an offset angle from said second staple leg; and
    bevel means along outside surfaces of distal ends of said first and second staple legs, said bevel means causing said first and second staple legs to deflect inwardly toward each other as said first and second staple legs are being driven through said first and second workpieces, said first and second staple legs crossing with respect to each other while avoiding contacting with each other due to said offset between said first and second staple legs as said first and second staple legs are deflected back into said second workpiece when said distal ends of said first and second legs contact said support means.

2. A clinch staple as set forth in claim 1 wherein said offset angle is about two degrees.

3. A method for installing at least one clinch staple from an assembly of clinch staples into workpiece means, said assembly of clinch staples including a plurality of clinch staples adhered together with each staple having a base portion and first and second legs extending generally parallel to each other and being offset at an offset angle from one another, said method comprising the steps of:
    removing one of said clinch staples from said assembly of clinch staples; and
    driving said removed clinch staple into said workpiece means by driving said first and second legs of said clinch staple through said workpiece means until said first and second legs contact an anvil positioned adjacent said workpiece means whereby said first and second legs are deflected back into said workpiece means and cross with respect to each other without contacting each other.

4. The method of claim 3 wherein distal ends of each of said first and second legs are each beveled whereby said first and second legs deflect inwardly toward each other as said first and second legs are being driven through said workpiece means.

5. The method of claim 3 wherein said offset angle is between about one degree and about five degrees.

* * * * *